United States Patent
Tezuka et al.

(10) Patent No.: US 7,598,971 B2
(45) Date of Patent: Oct. 6, 2009

(54) COLOR IMAGE FORMING APPARATUS

(75) Inventors: Hiroki Tezuka, Tokyo (JP); Yoshiyuki Akiba, Yokohama (JP); Hiroki Kitamura, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 609 days.

(21) Appl. No.: 11/444,406

(22) Filed: Jun. 1, 2006

(65) Prior Publication Data

US 2006/0290767 A1 Dec. 28, 2006

(30) Foreign Application Priority Data

Jun. 24, 2005 (JP) .............................. 2005-184947

(51) Int. Cl.
G03G 15/01 (2006.01)
B41J 2/525 (2006.01)
B41J 2/52 (2006.01)

(52) U.S. Cl. ....................................... 347/116; 399/301
(58) Field of Classification Search ......... 347/115–118; 399/298–302
See application file for complete search history.

(56) References Cited

U.S. PATENT DOCUMENTS

| 7,075,561 B2 | 7/2006 | Ozawa et al. ................ 347/116 |
| 7,344,217 B2 * | 3/2008 | Kitamura et al. .............. 347/15 |
| 2004/0239746 A1 | 12/2004 | Ozawa et al. ................ 347/116 |
| 2006/0232620 A1 | 10/2006 | Kitamura et al. .............. 347/15 |

FOREIGN PATENT DOCUMENTS

| JP | 2000-158707 | 6/2000 |
| JP | 2001-260422 | 9/2001 |
| JP | 2002-116394 | 4/2002 |
| JP | 2002-135586 | 5/2002 |
| JP | 2003-241131 | 8/2003 |
| JP | 2004-170755 | 6/2004 |
| JP | 2005-10746 | 1/2005 |
| JP | 2006-297633 | 11/2006 |

OTHER PUBLICATIONS

Computer-generated translation of JP 2005-010746 cited in the IDS filed on Jan. 5, 2007.*
European Official Letter Search Report, dated Sep. 26, 2006, in European Application No. 06011940.1.

* cited by examiner

Primary Examiner—Huan H Tran
(74) Attorney, Agent, or Firm—Fitzpatrick, Cella, Harper & Scinto

(57) ABSTRACT

A color image forming apparatus includes a coordinate conversion part, which converts a ordinate value, for executing a misregistration correction in the unit of a pixel; a gradation conversion part, which converts a gradation level, for executing a misregistration correction in a unit less than a pixel; and a judgment part, which detects a feature of the image and judges whether or not to execute the misregistration correction in a unit less than a pixel by the gradation conversion part. The judgment part compares the gradation level in an object pixel and a pixel adjacent in a sub-scanning direction, thereby judging whether or not to execute the misregistration correction in a unit less than a pixel. Thus, the invention enables to distinguish an image to be subjected to the registration correction in a unit less than a pixel and an image not to be subjected to such correction in a simple manner and also in consideration of the image color.

11 Claims, 19 Drawing Sheets

FIG. 7A
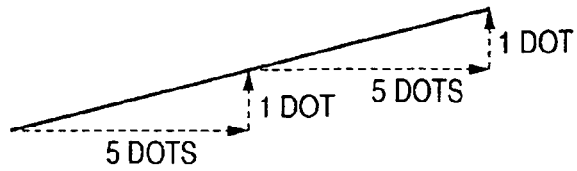
FIG. 7B
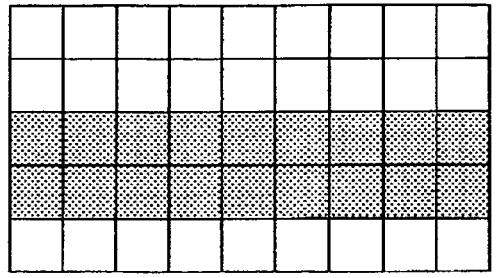
FIG. 7C
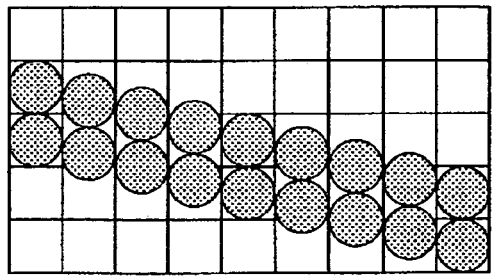
FIG. 7D
| Δy | 0 | 0.25 | 0.5 | 0.75 | 1 | 1.25 | 1.5 | 1.75 | 2 |
|---|---|---|---|---|---|---|---|---|---|
| k | 0 | 0 | 0 | 0 | 1 | 1 | 1 | 1 | 2 |
| β = Δy−k | 0 | 0.25 | 0.5 | 0.75 | 0 | 0.25 | 0.5 | 0.75 | 0 |
| α = 1−β | 1 | 0.75 | 0.5 | 0.25 | 1 | 0.75 | 0.5 | 0.25 | 1 |
FIG. 7E
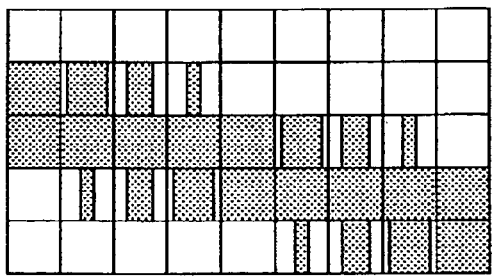
FIG. 7F
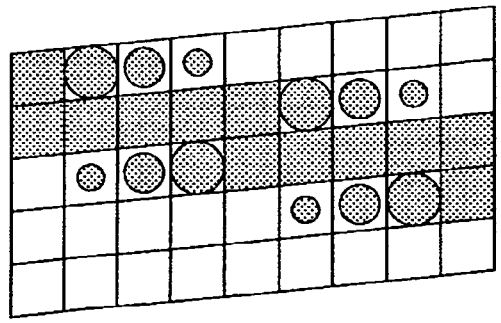

FIG. 8A
| Δy | 0 | 0.25 | 0.5 | 0.75 | 1 | 1.25 | 1.5 | 1.75 | 2 |
|---|---|---|---|---|---|---|---|---|---|
| k | 0 | 0 | 0 | 0 | 1 | 1 | 1 | 1 | 2 |
| β=0 | 0 | 0 | 0 | 0 | 0 | 0 | 0 | 0 | 0 |
| α=1 | 1 | 1 | 1 | 1 | 1 | 1 | 1 | 1 | 1 |
FIG. 8B
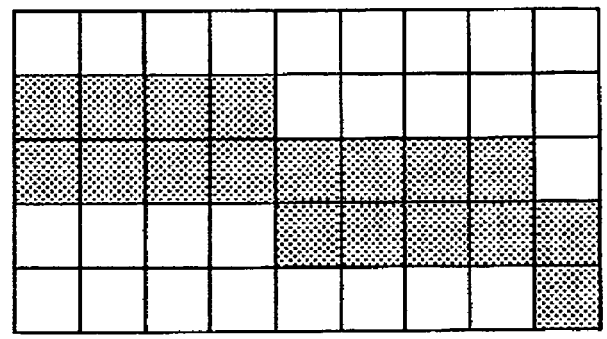
FIG. 8C
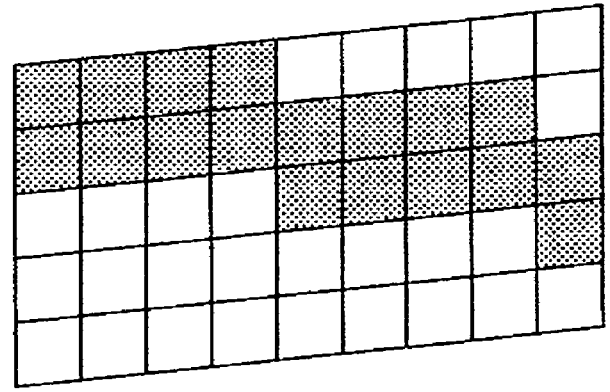

FIG. 10

| AREA | WIDTH (mm) | INCLINATION (mm) |
|---|---|---|
| AREA 1 | L1 | m1 |
| AREA 2 | L2 | m2 |
| AREA 3 | L3 | m3 |

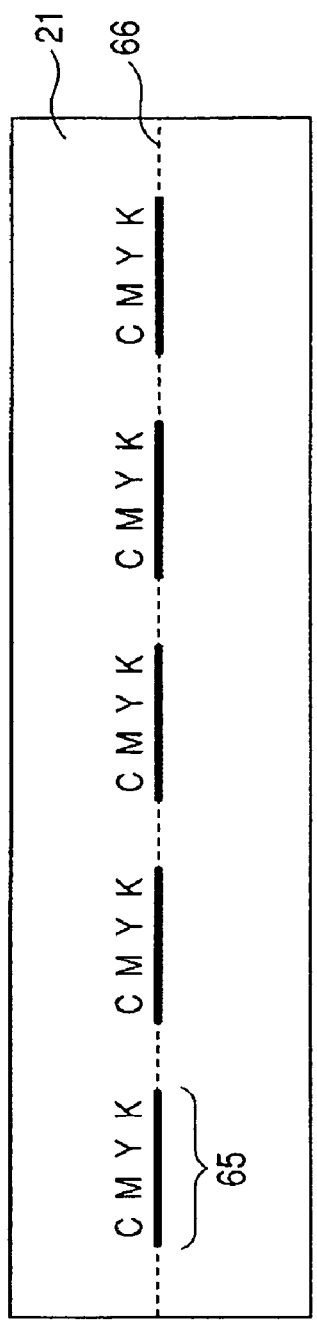
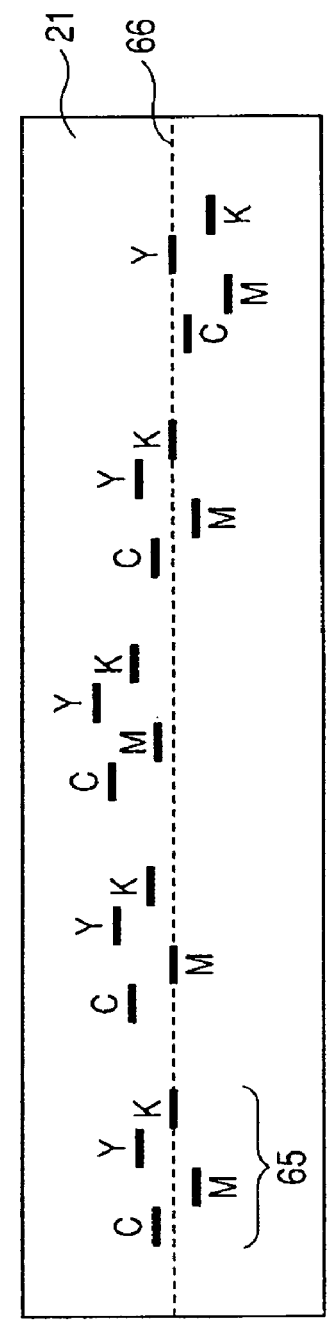
FIG. 11A
FIG. 11B

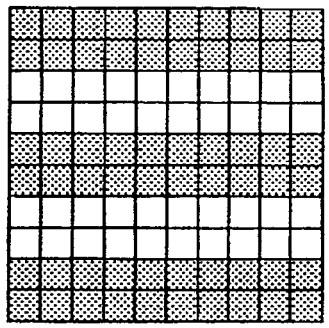
FIG. 13A1
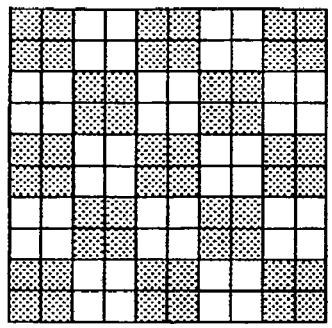
FIG. 13A2
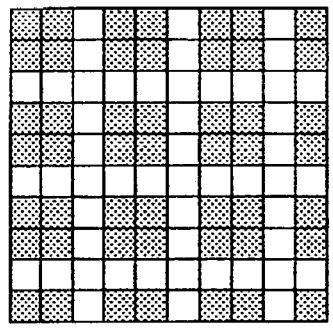
FIG. 13A3
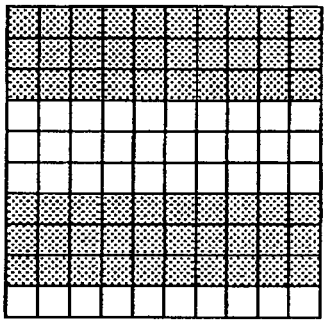
FIG. 13A4
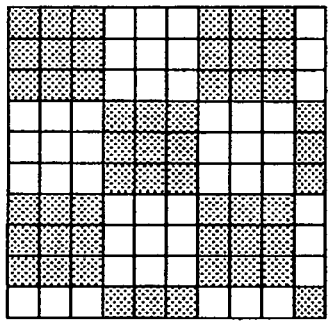
FIG. 13A5
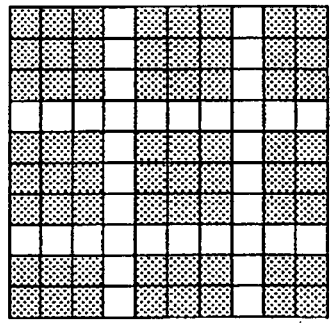
FIG. 13A6
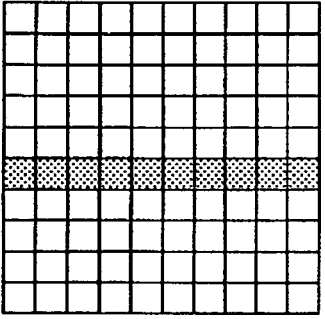
FIG. 13B1
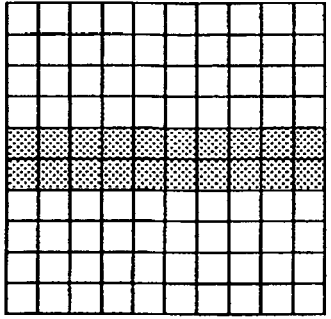
FIG. 13B2
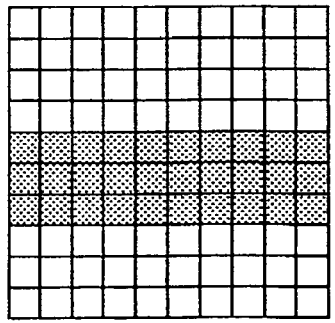
FIG. 13B3

FIG. 15

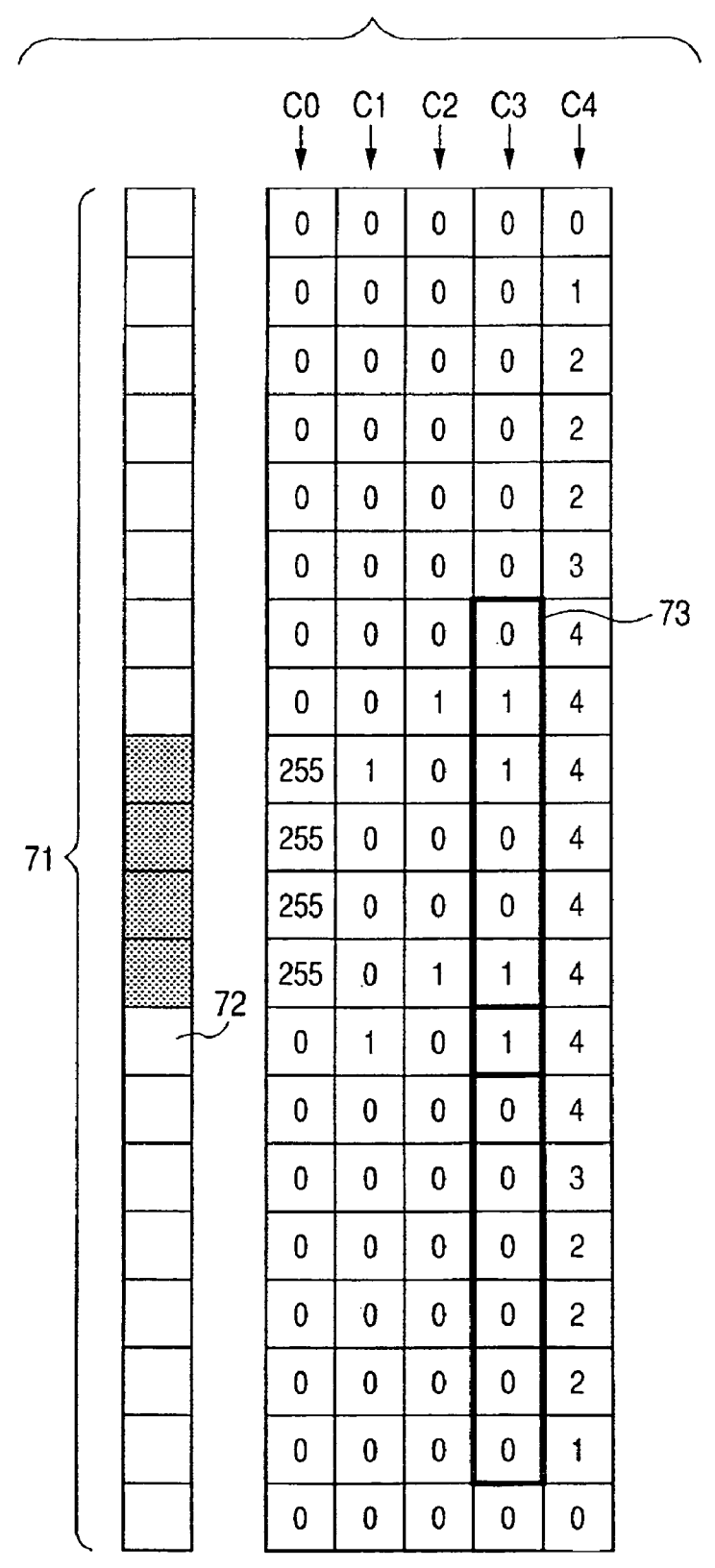

| | C0 | C1 | C2 | C3 | C4 |
|---|---|---|---|---|---|
| | 0 | 0 | 0 | 0 | 0 |
| | 0 | 0 | 0 | 0 | 1 |
| | 0 | 0 | 0 | 0 | 2 |
| | 0 | 0 | 0 | 0 | 2 |
| | 0 | 0 | 0 | 0 | 2 |
| | 0 | 0 | 0 | 0 | 3 |
| | 0 | 0 | 0 | 0 | 4 |
| | 0 | 0 | 1 | 1 | 4 |
| | 255 | 1 | 0 | 1 | 4 |
| | 255 | 0 | 0 | 0 | 4 |
| | 255 | 0 | 0 | 0 | 4 |
| | 255 | 0 | 1 | 1 | 4 |
| | 0 | 1 | 0 | 1 | 4 |
| | 0 | 0 | 0 | 0 | 4 |
| | 0 | 0 | 0 | 0 | 3 |
| | 0 | 0 | 0 | 0 | 2 |
| | 0 | 0 | 0 | 0 | 2 |
| | 0 | 0 | 0 | 0 | 2 |
| | 0 | 0 | 0 | 0 | 1 |
| | 0 | 0 | 0 | 0 | 0 |

FIG. 20

| CONDITION | C | M | Y | K |
|---|---|---|---|---|
| THRESHOLD VALUE FOR BINARIZING AN IMAGE | 128 | 150 | | 100 |
| THRESHOLD VALUE FOR IMAGES WHICH A REGISTRATION CORRECTION IS EXECUTED AND NOT EXECUTED (SUB-SCANNING) | 5 | 5 | | 9 |
| THE SIZE OF WINDOW FILTER (SUB-SCANNING) | 1×13 | 1×11 | | 1×20 |
| THRESHOLD VALUE FOR IMAGES WHICH A REGISTRATION CORRECTION IS EXECUTED AND NOT EXECUTED (MAIN-SCANNING) | 3 | 5 | | 3 |
| THE SIZE OF WINDOW FILTER (MAIN-SCANNING) | 9×1 | 11×1 | NOT EXECUTED | 13×1 |

COLOR IMAGE FORMING APPARATUS

BACKGROUND OF THE INVENTION

1. Field of the Invention

The present invention relates to a color image forming apparatus especially called as a tandem-type color image forming apparatus, which has developing means of a plurality of colors and means which transfers in order images of the plurality of colors formed by the developing means.

2. Related Background Art

In recent years, for achieving a higher image forming speed in an electrophotographic color image forming apparatus, a tandem-type color image forming apparatus which has developing devices and photosensitive drums whose numbers are the same as a number of colors and in which images of different colors are transferred in order onto an image conveying belt or a recording material, is increasing popularity. Such a tandem-type color image forming apparatus is known to include a plurality of disadvantageous factors which causes a misregistration, and various countermeasures are being proposed for each of the disadvantage factors.

One of the disadvantageous factors is an unevenness or a mounting misalignment of a lens of a deflection scanning apparatus, or a mounting misalignment of the deflection scanning apparatus on a main body of the color image forming apparatus. In such case, the scanning line shows an inclination or a curvature. Since the inclination or a curvature depends on a color, their differences for colors cause a misregistration.

As a countermeasure to such misregistration, Japanese Patent Application Laid-open No. 2002-116394 discloses a method, in an assembling step of the deflection scanning apparatus, of measuring a magnitude of the curvature of the scanning line with an optical sensor, then correcting the curvature of the scanning line by mechanically rotating the lens and then fixing the lens with an adhesive.

Also Japanese Patent Application Laid-open No. 2003-241131 discloses a method, in a step of mounting the deflection scanning apparatus on the main body of the color image forming apparatus, of measuring a magnitude of inclination of the scanning line, then regulating the inclination of the scanning line by mechanically inclining the deflection scanning apparatus and mounting the same onto the main body of the color image forming apparatus.

Also Japanese Patent Application Laid-open No. 2004-170755 discloses a method of measuring an inclination and a curvature of the scanning line with an optical sensor, and correcting bit map image data so as to cancel such inclination and curvature, thereby forming a corrected image. This method, being based on an electrical processing of the image data and therefore dispensing with a mechanical regulating member or an adjusting step in the assembling, can achieve a less expensive correction of the misregistration, in comparison with the methods described in Japanese Patent Application Laid-open Nos. 2003-241131 and 2004-170755. Such electrical correction of misregistration is categorized as a misregistration correction for a pixel in the unit of a pixel or a misregistration correction for a pixel less than a pixel (hereinafter referred to as "correction less than a pixel"). The correction in the unit of a pixel is executed, as shown in FIG. 6, by offsetting the pixel in a sub-scanning direction in the unit of a pixel, according to the correction amount for the inclination and curvature. The correction less than a pixel is executed, as shown in FIG. 7, by regulating a gradation level of the bit map image data, in preceding and succeeding pixels in the sub-scanning direction. Such correction less than a pixel allows to remove an unnatural step difference generated at a boundary of offsetting in the correction in the unit of a pixel, thereby smoothing the image.

Further, Japanese Patent Application Laid-open No. 2005-297633 discloses a countermeasure to a density unevenness in a fine image, induced by a correction less than a pixel and constituting a drawback of the afore-mentioned electrical correction for the misregistration. Such density unevenness in a fine image will be explained with reference to FIG. 9. In FIG. 9, an upper part shows an input image, which is a fine line having a certain gradation having a certain gradation level. A correction for misregistration on such input image provides an image as shown in a middle part in FIG. 9, with a toner density as shown in a lower part. Thus, while the input image has a constant gradation level, the output image after the correction of misregistration becomes a fine line having an uneven density. Such a phenomenon is induced from a fact that an electrophotographic image forming apparatus is not adapted for forming an isolated pixel, while maintaining a proportional relationship between a gradation value of image and an actual image density. In a fine image formed by such fine lines, the influence of such a phenomenon appears conspicuously as a density unevenness.

One of the countermeasures to such density unevenness in the fine image is not to execute the correction less than a pixel, on a fine image. More specifically, there a method is known to binarize an image, then to compare the binarized image with a smoothing judgment pattern stored in advance, and not to execute a correction less than a pixel in case the binarized image matches the pattern but to execute a correction less than a pixel in case the binarized image does not match the pattern.

However, such known methods are associated with the following drawbacks. In the electrical correction to misregistration which is one of countermeasures to the misregistration, the density unevenness may be generated in various fine images. Though non-execution of the correction less than a pixel on a fine image is effective in avoiding the density unevenness, it is impractical, in consideration of a memory capacity, to store all the fine images that give rise to the density unevenness as the smoothing judgment patterns.

Also a level of the density unevenness varies depending on a color of the image. The prior countermeasures, not taking image color into consideration, may execute a correction that rather makes the density unevenness more conspicuous.

SUMMARY OF THE INVENTION

An object of the present invention is to improve a quality of an output image of a color image forming apparatus, without a significant increase in cost.

Another object of the present invention is to provide a method, in the case where an electrical correction of misregistration is executed, of judging whether an image is to be or not to be executed by a correction less than a pixel, in a simple manner and in consideration of an image color.

A further object of the present invention is to provide a color image forming apparatus comprising a plurality of image forming parts each of which forms an image, a transfer part which transfers in order images of a plurality of colors formed by the plurality of image forming parts, a first conversion part which converts a coordinate value of the image, based on a misregistration amount of the image, for executing a misregistration correction in the unit of a pixel, a second conversion part which converts a gradation of the image, based on the misregistration amount of the image, for executing a misregistration correction in a unit less than a pixel; and a judgment part which judges whether or not to execute the misregistration correction in a unit less than a pixel by the second conversion part on an object pixel, based on pixels around the object pixel.

Still further objects and constitutions of the present invention, and effects thereof, will become fully apparent from the following detailed description which is to be taken in conjunction with the accompanying drawings.

BRIEF DESCRIPTION OF THE DRAWINGS

FIGS. 7A, 7B, 7C, 7D, 7E and 7F are views showing a method of a correction less than a pixel for misregistration in the embodiment 1;

FIGS. 8A, 8B and 8C are views showing a method not executing a correction less than a pixel for misregistration in the embodiment 1;

FIG. 10 is a view showing an example of information stored in a misregistration amount memory means in the embodiment 1;

FIGS. 11A and 11B are views showing examples of a misregistration measuring chart in the embodiment 1;

FIGS. 13A1, 13A2, 13A3, 13A4, 13A5, 13A6, 13B1, 13B2 and 13B3 are views each of which shows an example of a fine image and an isolated fine line in the embodiment 1;

FIG. 15 is a view showing a judgment method in smoothing judgment means in the embodiment 1;

FIG. 20 is a chart showing an example of conditions set for respective colors, in an embodiment 4.

DETAILED DESCRIPTION OF THE PREFERRED EMBODIMENTS

Embodiment 1

Figure 1:
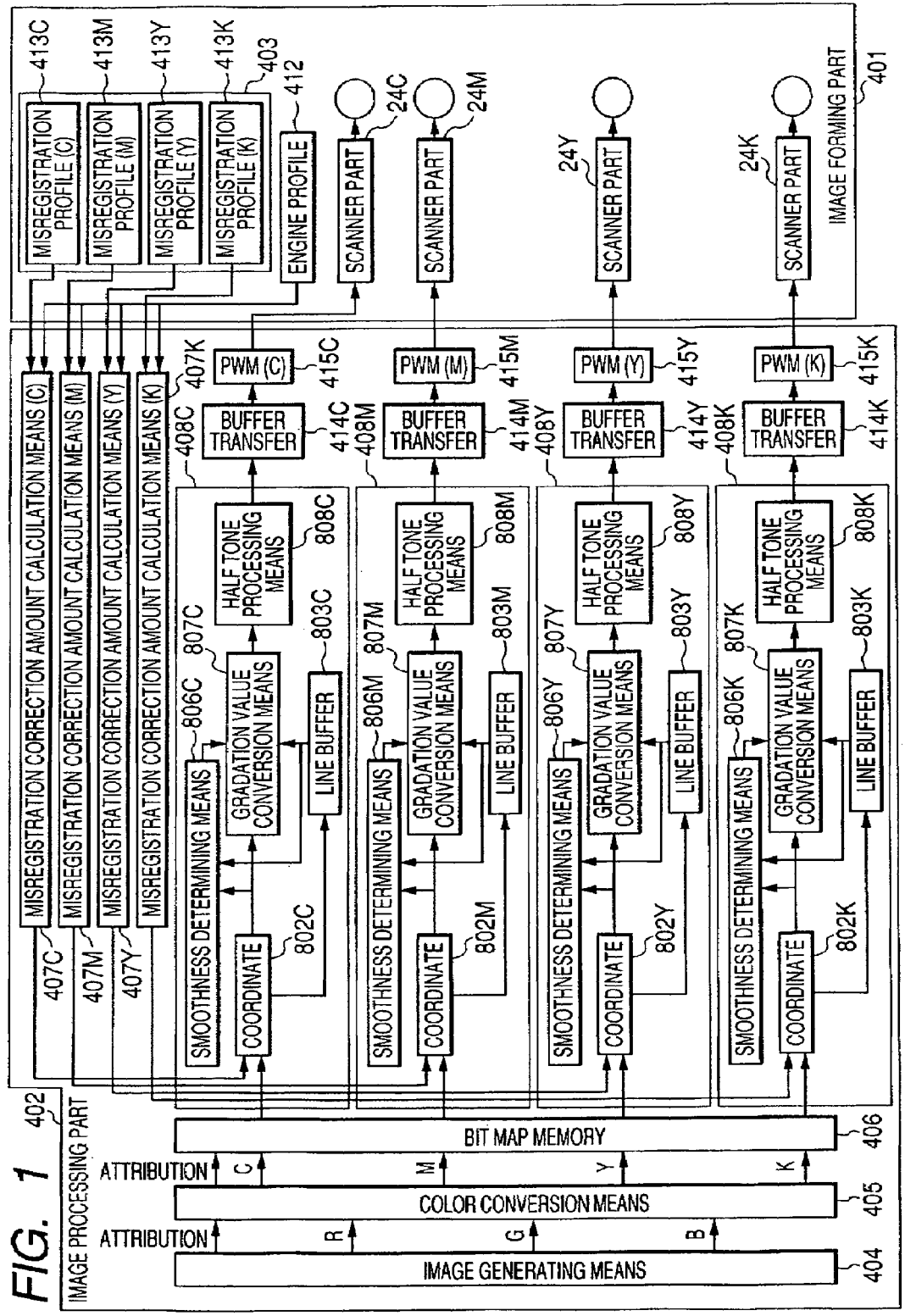
FIG. 1 is a diagram of a circuit block relating to formations of electrostatic latent images in a color image forming apparatus in an embodiment 1.

FIG. 1 is a block diagram showing circuit blocks relating to formation of electrostatic latent images in an electrophotographic color image forming apparatus in the embodiment 1. The color image forming apparatus is provided with an image forming part 401 and an image processing part 402. The image processing part 402 prepares bit map image information, based on which the image forming part 401 executes image formation on a recording medium.

Figure 2:
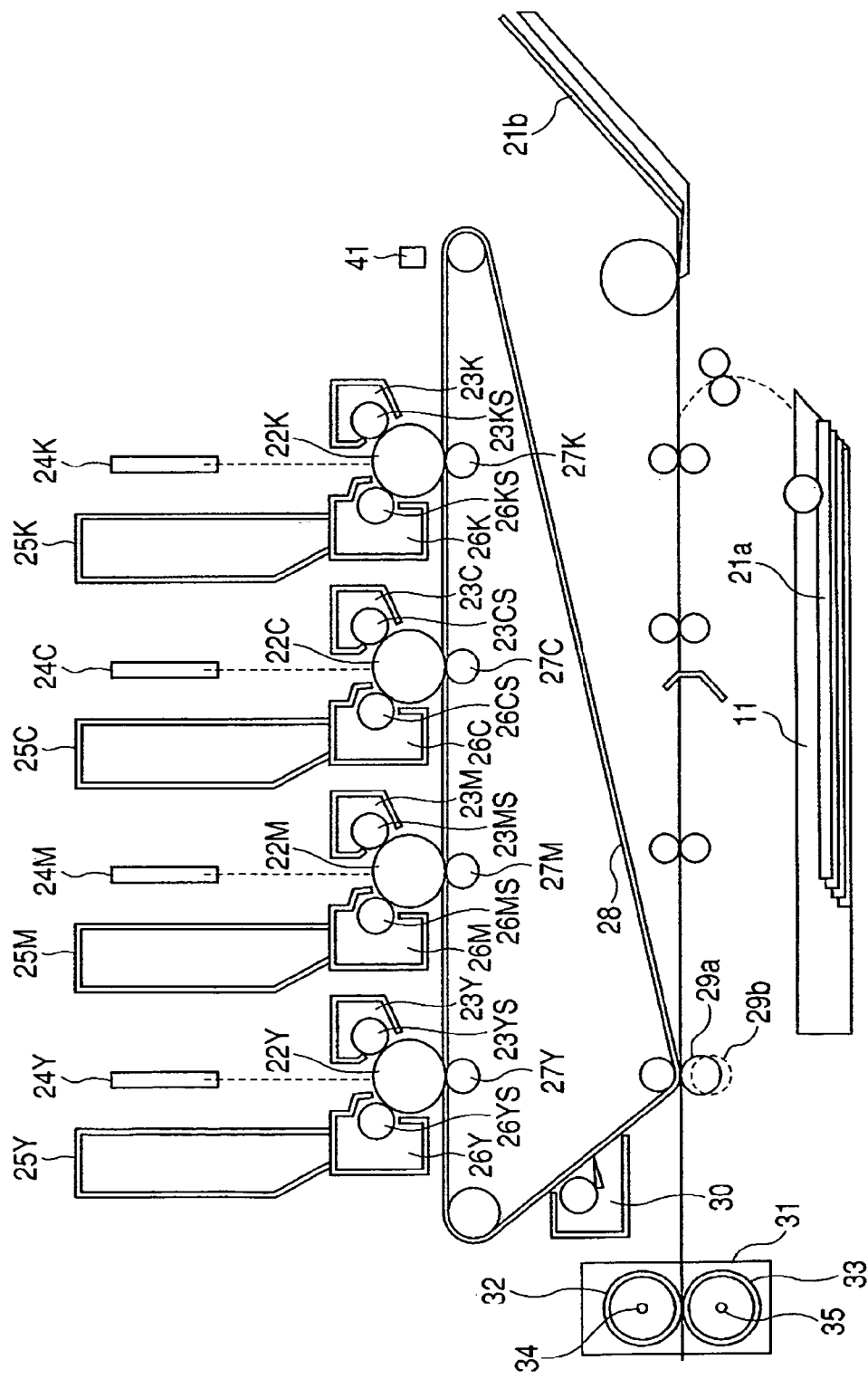
FIG. 2 is a cross-sectional view of the color image forming apparatus of the embodiment 1.

FIG. 2 is a cross-sectional view of a tandem-type color image forming apparatus utilizing an intermediate transfer member 28, as an example of the electrophoto graphic color image forming apparatus. Now, the functions of the image forming part 401 in the electrophotographic color image forming apparatus will be explained with reference to FIG. 2.

The image forming part 401 activates exposing light according to exposure times determined by the image processing part 402 thereby forming electrostatic latent images, then develops the electrostatic latent images to obtain single-colored toner images, superposes the single-colored toner images to obtain a multi-colored toner image, then transfers the multi-colored toner image onto a recording medium 11 and fixes the multi-colored toner image onto the recording medium.

Charging means is provided in the respective stations of yellow (Y), magenta (M), cyan (C) and black (K) each of which respectively chargers 23Y, 23M, 23C and 23K. Each of the stations of yellow (Y), magenta (M), cyan (C) and black (K) charges photosensitive members 22Y, 22M, 22C and 22K, and the injection chargers are respectively provided with sleeves 23YS, 23MS, 23CS and 23KS.

Each of the photosensitive members 22Y, 22M, 22C and 22K is formed by coating an organic photoconductor layer on an aluminum cylinder, and is rotated by a driving power of an unillustrated driving motor, which rotates the photosensitive members 22Y, 22M, 22C and 22K counterclockwise in the image forming operations.

Exposure means emits exposing lights from scanner parts 24Y, 24M, 24C and 24K onto the photosensitive members 22Y, 22M, 22C and 22K to selectively expose surfaces thereof, thereby forming electrostatic latent images.

Developing means includes, in the respective stations, four developing devices 26Y, 26M, 26C, 26K for executing development of the electrostatic latent images in yellow (Y), magenta (M), cyan (C) and black (K) colors, and the developing devices are equipped with sleeves 26YS, 26MS, 26CS and 26KS. Each developing device is rendered detachable.

Transfer means, for transferring the single-colored toner images from the photosensitive members 22 to the intermediate transfer member 28, rotates the intermediate transfer member 28 clockwise, and executes the transfer of the single-colored toner images along rotations of the photosensitive members 22Y, 22M, 22C and 22K and of primary transfer rollers 27Y, 27M, 27C and 27K, opposed thereto. The single-colored toner images are transferred onto the intermediate transfer member 28 by applying appropriate bias voltages to the primary transfer rollers 27 and providing a difference between rotation speeds of the photosensitive members 22 and of the intermediate transfer member 28. Such a transfer operation is called a primary transfer.

The transfer means superposes the single-color toner images of the respective stations onto the intermediate transfer member 28, transports thus superposed multi-colored toner image by the rotation of the intermediate transfer member 29 to a secondary transfer roller 29, also conveys the recording medium 11 from a sheet feeding tray 21 to the secondary transfer roller 29, and transfers the multi-colored toner image from the intermediate transfer member 28 onto the recording medium 11. The toner image is electrostatically transferred by applying an appropriate bias voltage to the secondary transfer roller 29. Such a transfer operation is called a secondary transfer. The secondary transfer roller 29 is maintained in a position 29a in contact with the recording medium 11 during the transfer of the multi-colored toner image onto the recording medium 11, but is separated to a position 29b after the printing process.

Fixing means is provided, for fuse-fixing the multi-colored toner image transferred on the recording medium 11 thereon, with a fixing roller 32 for heating the recording medium 11 and a pressure roller 33 for pressing the recording medium 11 to the fixing roller 32. The fixing roller 32 and the pressure roller 33 are constructed in hollow structures, in which heaters 34, 35 are respectively incorporated inside. A fixing apparatus 31 conveys the recording medium 11, bearing the multi-colored toner image thereon, by the fixing roller 32 and the pressure roller 33 and applies heat and pressure thereto, thereby fixing the toner to the recording medium 11.

The recording medium 11 after the toner fixation is then discharged by unillustrated discharge rollers onto an unillustrated discharge tray, whereby the image forming operation is terminated.

Cleaning means 30 is provided for removing the toner remaining on the intermediate transfer member 28, and used toner remaining, on the intermediate transfer member 28, after the transfer of the four-colored toner image onto the recording medium 11, is collected in a cleaner container.

Figure 3:
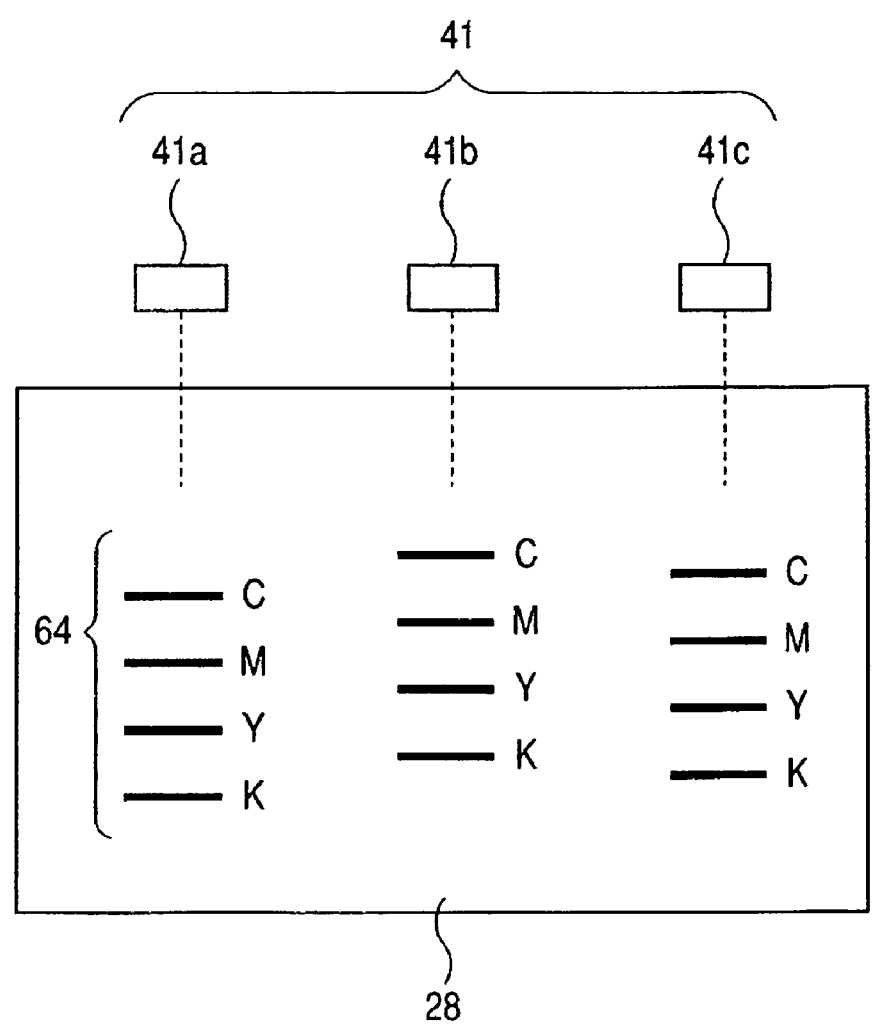
FIG. 3 is a view showing an example of a registration detection patch in the embodiment 1.

A registration detection sensor 41 is provided in a position opposed to the intermediate transfer member 28. A registration detection patch 64 is formed on the intermediate transfer member 28, and a misregistration amount of each color is judged from a detection timing of the patch. FIG. 3 shows an example of such detection, wherein three registration detection sensors 41a, 41b, 41c are provided along a scanning direction, and registration detection patches 64 of C, M, Y, K colors pass under the respective sensors.

Figure 4:
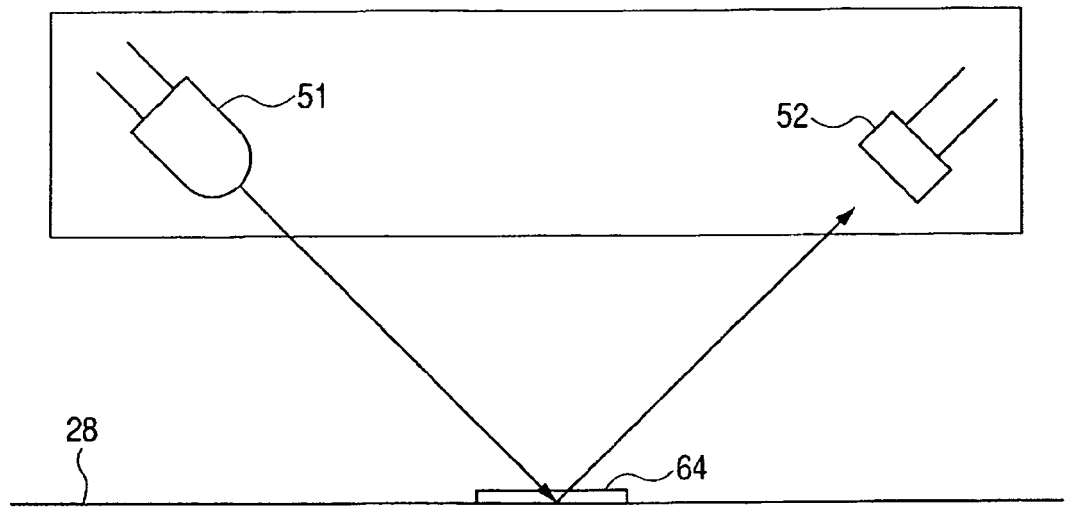
FIG. 4 is a view showing an example of a registration detection sensor in the embodiment 1.

Detection of misregistration in three positions, namely left, center and right, along the scanning direction as shown in FIG. 3 detects magnitudes of an inclination and a curvature of the scanning line. Some color image forming apparatuses are provided with the registration detection sensors 41 only in two positions, namely at left and right, and such a structure only allows detecting a magnitude of inclination. An example of the structure of the registration detection sensor is shown in FIG. 4. It is constructed with an infrared light-emitting element 51 such as an LED, a light-receiving element 52 such as a photodiode, an unillustrated IC for processing received optical data, and an unillustrated holder containing these components. The light-receiving element 52 detects an intensity of a reflected light from the toner patch. FIG. 4 shows a structure for receiving a normally reflected light, but such structure is not restrictive and a randomly reflected light may be used for detection. Also for coupling the light-emitting element 51 and the light-receiving element 52, an optical element such as an unillustrated lens may be employed.

Figure 5:
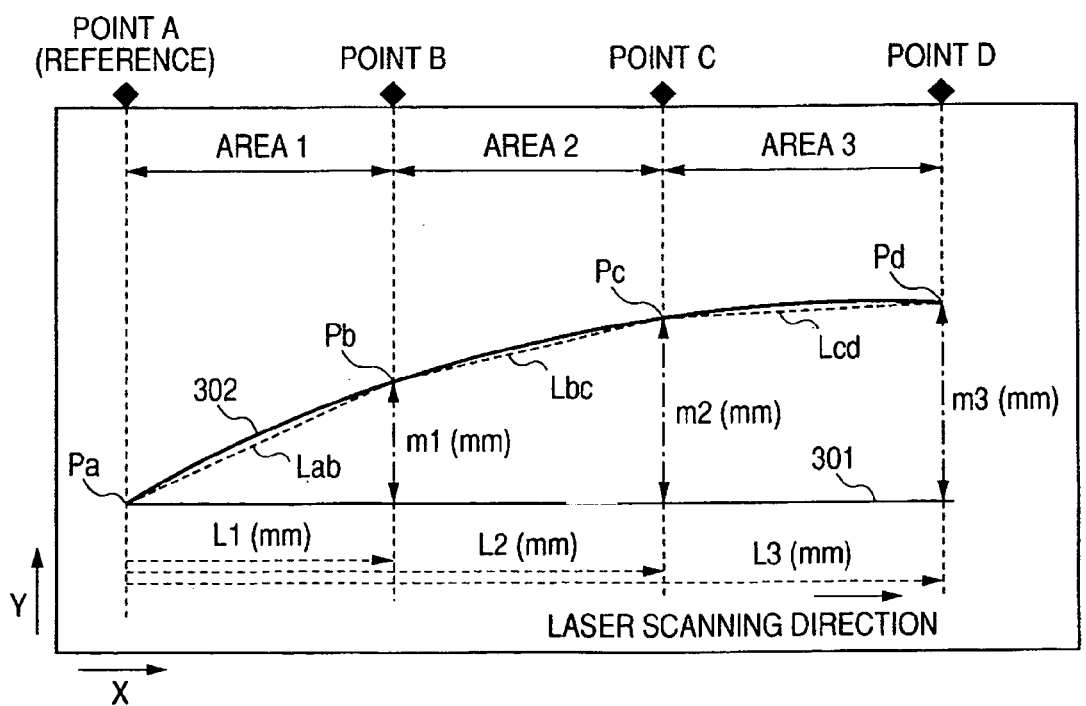
FIG. 5 is a view showing a misregistration in the embodiment 1.

Now reference is made to FIG. 5 for explaining a misregistration in the scanning line. As shown by an ideal scanning line 301, a scanning operation is executed in perpendicular to the rotating direction of the photosensitive member 22. As shown by an actual scanning line 302 involving an inclination and a curvature, it results from aberrations in positional precision and diameter of the photosensitive member 22, and in positional precisions of optical systems in the scanner parts 24 of respective colors. As the magnitudes of such inclination and curvature in the scanning line are mutually different in the respective C, M, Y and K imaging stations; a misregistration is generated in the image formed by transferring the toner images of all the colors onto the intermediate transfer member 28. In the present embodiment, an error amount between the ideal scan line 301 and the actual scan line 302 in the sub-scanning direction is measured along the main scanning direction (X-direction), taking a scanning start point A in the print area as a reference point, at a plurality of points (B, C and D), then the error amount is divided into a plurality of areas between the measuring points (area 1 between Pa and Pb, area 2 between Pb and Pc, and area 3 between Pc and Pd), and the inclination of the scan line is approximated by linear segments (Lab, Lbc, Lcd) connecting these points. Therefore, in case a difference in the error amounts between the points (m1 for area 1, m2−m1 for area 2 and m3−m2 for area 3) is positive, the scan line in such area is inclined upward to the right, and, in case the difference is negative, the scan line is inclined downward to the right.

In the following, a process in the image processing part of the color image forming apparatus will be explained with reference to FIG. 1.

Image generation means 404 generates, from print data received for example from an unillustrated computer, raster image data adapted for use in a printing process, and outputs, for each pixel, RGB data and attribute data indicating data attributes of each pixel. Color conversion means 405 converts the RGB data into CMYK data matching the colors of the toners in the image forming part 402, and stores CMYK data and the attribute data in a bit map memory 406. The bit map memory 406 temporarily stores the raster image data to be used in the printing process, and is constituted of a page memory capable of storing image data of one page, or a band memory capable of storing data of a plurality of lines.

Misregistration correction means 408C, 408M, 408Y, 408K executes a correction for the misregistration caused by the inclination and curvature of the scan line. Details of process therein will be explained later. The bit map image corrected for the misregistration is transmitted through transfer buffers 414C, 414M, 414Y, 414K and is converted, by PWM (pulse width modulation) means 415C, 415M, 415Y, 415K into exposure times of the scanner part 24C, 24M, 24Y, 24K.

Now, details of the correction for the misregistration in the present embodiment will be explained with reference to FIG. 1. The principal steps are as follows:
(1) Misregistration profile information 413C, 413M, 413Y, 413K are stored in the misregistration amount memory means 403;
(2) Based on the misregistration profile information 413C, 413M, 413Y, 413K and the engine profile information 412, the misregistration correction amount calculation means 407C, 407M, 407Y, 407K calculate a correction amount for each color in each pixel; and
(3) Based on the calculated correction amount for each pixel, the misregistration correction means 408C, 408M, 408Y, 408K execute a correction on the bit map data.

In the following discussion, each of these steps will be explained.

In the step (1), the misregistration profile information 413 is stored in the misregistration amount memory means 403 incorporated in the image forming part 401. The profile is in a format for example of an error amount between the actual scan line 302 and the ideal scan line 301 in the sub-scan direction, measured at a plurality of points in each color. A table in FIG. 10 shows an example of the information stored in the misregistration amount memory means 403. The profile is not limited to such a format, but may assume any format capable of identifying the inclination and curvature characteristics of the scan line The misregistration profile information 413 to be stored in the misregistration amount memory means 403 may be acquired by several methods. As a first method such an error amount is measured and acquired in a manufacturing step of the color image forming apparatus. As a second method, the error amount is obtained, utilizing the registration detection sensor 41 explained above, by detecting a registration detection patch formed on the intermediate transfer member 28. In a third method, a misregistration measuring chart as shown in FIG. 11 is outputted by the image forming apparatus, then the image is converted for example by a commercial image scanner into electronic information, from which the profile information is obtained. FIGS. 11A and 11B show a misregistration measuring patch 65 formed on a recording medium 11. Though images are formed in such a manner that C, M, Y and K color patches are aligned on a scan line 66 as shown in FIG. 11A, the patches are in fact displaced from the scan line 66 as shown in FIG. 11B. The profile information can be obtained by measuring the error amounts from the electronic information.

In the step (2), based on the misregistration profile information 413 stored in the misregistration amount memory means 403, the misregistration correction amount calculation means 407 calculates a correction amount for canceling the misregistration and outputs it to the misregistration correction means 408. Calculations for the areas shown in FIG. 5 are shown in the following, for coordinate data x (in dot) in the main scanning direction, a misregistration correction amount $\Delta y$ (in dots) in the sub-scanning direction, and an image forming resolution r (dpi):

$$\Delta y1 = x \times (m1/L1) \quad \text{area 1:}$$

$$\Delta y2 = m1/r + (x - (L1/r)) \times ((m2-m1)/(L2-L1)) \quad \text{area 2:}$$

$$\Delta y3 = m2/r + (x - (L2/r)) \times ((m3-m2)/(L3-L2)) \quad \text{area 3:}$$

wherein L1, L2 and L3 are distances (mm) from the print start position to right ends of the areas 1, 2 and 3 in the main scanning direction; and m1, m2 and m3 are error amounts between the ideal scan line 301 and the actual scan line 302 at right ends of the areas 1, 2 and 3.

An inclination in each area can be determined from deviations at the measuring points, and ys from the exposure unit profile data in each pixel is determined in the entire area from:

$$\Delta ys = x \times (m1/L1), (0 \leq x < L1);$$

$$\Delta ys = m1/r + (x - (L1/r)) \times ((m2-m1)/(L2-L1)),$$
$$(L1 \leq x < L1 + L2); \text{ and}$$

$$\Delta ys = m2/r + (x - L2/r) \times ((m3-m2)/(L3-L2)), (L1 + L2 \leq x < L1 + L2 + L3).$$

After ys is determined in this manner, an "x" value where ys reaches an integral dot in the image forming resolution is determined and a readout position of the coordinate conversion means 802 in the vertical direction is changed at such x value.

Figure 12:
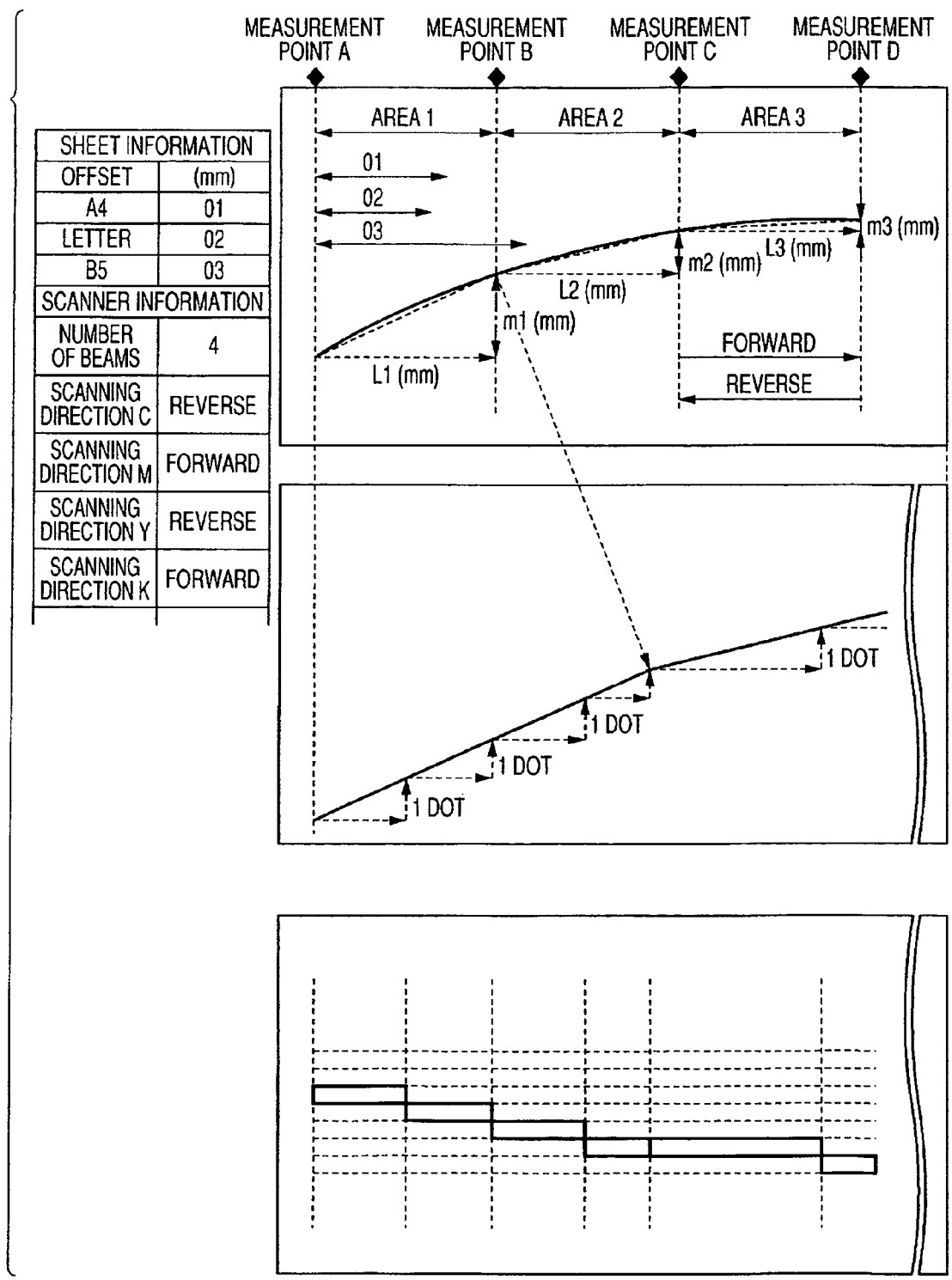
FIG. 12 is a chart showing a relationship between an engine profile and an exposure profile in the embodiment 1.

The engine profile information stored in the engine profile memory means 412 includes offset amount information from a reference point in a sheet size, a scanning direction information of the scanning beam for each color, and a recording medium conveying speed. FIG. 12 shows an example of the engine profile and a relationship with the exposure profile.

In case the scanning is executed in different directions, the correction amount is to be given a sign according to the scanning direction. For example, the misregistration amount in FIG. 12 is treated as a negative value for a forward scanning direction and as a positive value for a reverse scanning direction.

In case the printing is executed in different speeds, it may be necessary to change the correction amount accordingly. For example, in case the image formation is executed at ½ of a normal image forming speed, the scanning speed is not changed and the image output is executed in one of two scanning operation but not executed in the other. In such case, the correction amount has to be ½ of that in the normal image forming speed. Also depending on the sheet size, the correction amount has to be calculated with profile data of an area corresponding to the sheet size.

In the step (3), based on thus calculated correction amount for each pixel, the misregistration correction means 408 executes a correction of the bit map data. The misregistration correction means 408 is constituted of a coordinate conversion means 802, a line buffer 802, smoothing judgment means 806, gradation conversion means 807, and halftone process means 808.

A line buffer 803 is a memory having a capacity of a line, and stores the information of a correction amount from the bit map memory 406, in the unit of a line.

Coordinate conversion means 802 executes, based on the coordinate position data in the main and sub-scanning directions and on the misregistration correction amount $\Delta y$ obtained from the misregistration correction amount calculation means 407, a correction in an integral part of the misregistration correction amount $\Delta y$ in the line buffer 803, namely a misregistration correction amount $\Delta y$ in the unit of a pixel, thus reconstructing the output image data.

Figure 6A:
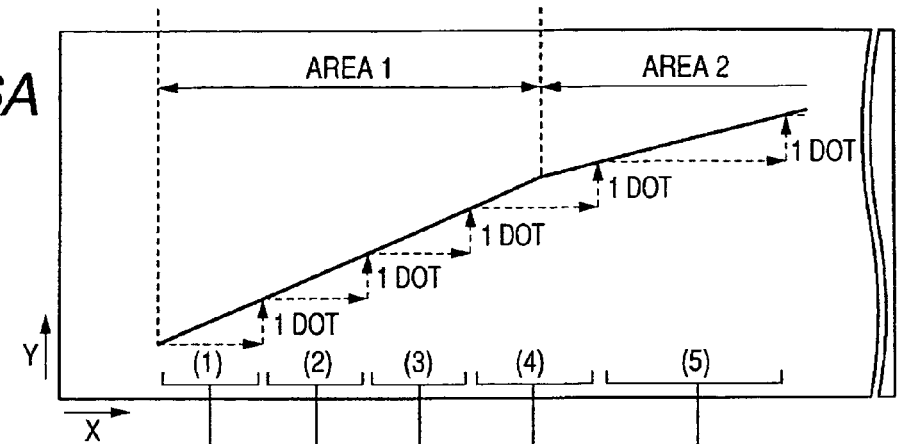
FIGS. 6A, 6B and 6C are views showing a method of a correction in the unit of a pixel for misregistration in the embodiment 1.
Figure 6B:
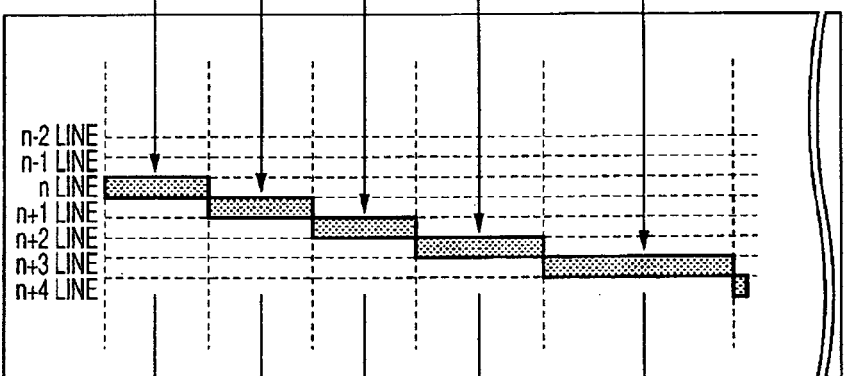
Figure 6C:
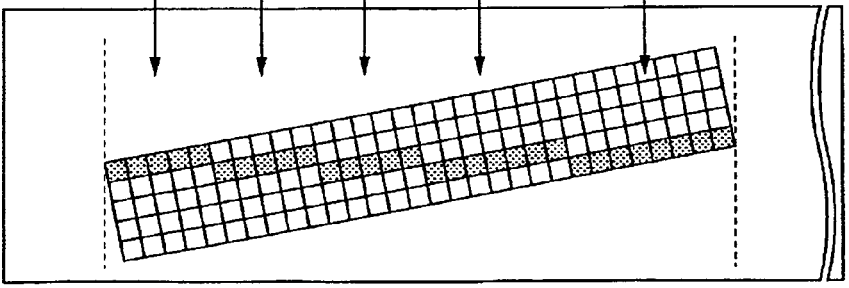
Figure 9:
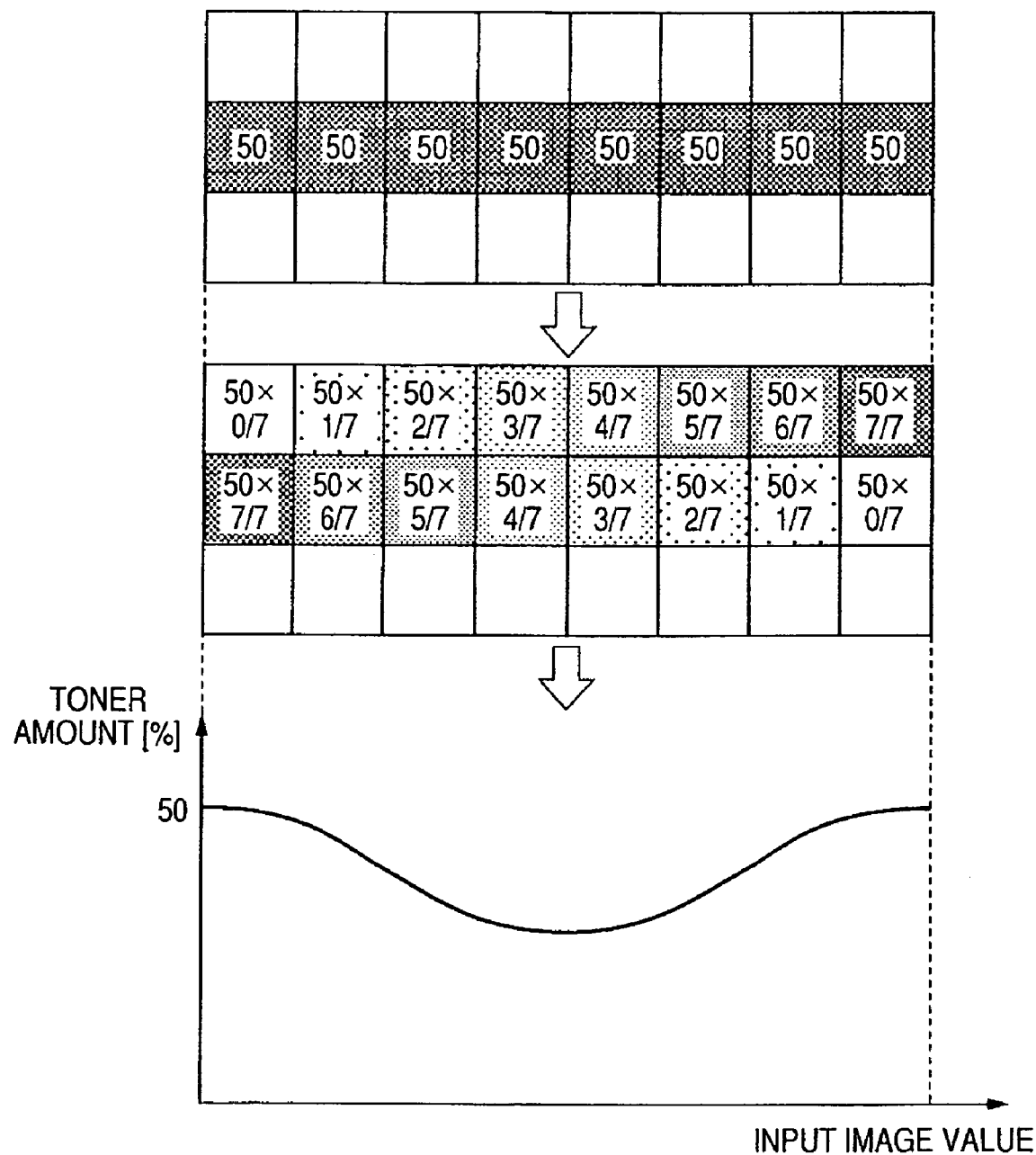
FIG. 9 is a view showing a density unevenness in a fine line in a prior example.

Now, the correction process in the coordinate conversion means 802 will be explained with reference to FIGS. 6A to 6C. The coordinate conversion means 802 offsets the coordinate of the image data, in the sub-scanning direction (Y-direction), stored in the bit map memory 406, according to an integral value of the misregistration correction amount $\Delta y$, that can be determined from the misregistration information of the scanning line approximated with linear segments as shown in FIG. 6A. For example, in case of reconstructing the data of n-th line in the sub-scanning direction as shown in FIG. 6B, the misregistration correction amount $\Delta y$ is equal to or larger than 0 but smaller than 1 at a main-scanning coordinate position x within a region (1) in FIG. 6A, so that the data of n-th line are read from the bit map memory. In a region (2) in FIG. 6A, the misregistration correction amount $\Delta y$ is equal to or larger than 1 but smaller than 2, so that a coordinate conversion process is executed so as to read a bit map image with a 1-line offset, namely data of an (n+1)th line from the bit map memory. Similarly the coordinate conversion process is so executed as to read data of an (n+2)th line in a region (3) in FIG. 6A, and data of an (n+3)th line in a region (4). In this manner the output image data are reconstructed. The output image data are reconstructed through the method explained above. FIG. 6C shows an image formed by exposing the image bearing member to the image data, subjected to the misregistration correction in the unit of a pixel by the coordinate conversion means 802. In the foregoing there has been explained a method of executing the misregistration correction in the unit of a pixel when reading image data from the bit map memory 406, but it is also possible to execute a misregistration correction in the unit of a pixel at image data writing into the line buffer 803. More specifically, in reading image data of a line from the bit map memory 406 and writing such image data into the line buffer 803, the data writing line may be switched according to the regions (1) to (5) shown in FIG. 6A.

Now, reference is made to FIGS. 7A to 7F for explaining a misregistration correction less than a pixel, namely a misregistration correction for a fractional part of the misregistration correction amount $\Delta y$, executed by the gradation conversion means 807. The correction of a fractional part for misregistration is executed by regulating gradation levels of pixels preceding and succeeding in the sub-scanning direction.

FIG. 7A shows an inclination misregistration of a scanning line having an upward inclination to the right. FIG. 7B shows a bit map image of a horizontal line prior to the gradational correction (gradation conversion), and FIG. 7C shows a corrected bit map image for FIG. 7B for canceling the misregistration caused by the inclination of scanning line shown in FIG. 7A. For realizing the corrected image shown in FIG. 7C, the preceding and succeeding pixels in the sub-scanning direction are regulated in the gradation levels. FIG. 7D shows a table indicating a relationship between the misregistration correction amount $\Delta y$ and a correction coefficient for gradational conversion, in which k is an integral part of the misregistration correction amount $\Delta y$ (fractional part being discarded), indicating a correction amount in the unit of a pixel in the sub-scanning direction. $\beta$ and $\alpha$ are correction coefficients for executing a correction less than a pixel in the sub-scanning direction, and indicate distribution rates of the gradation levels between the preceding and succeeding pixels in the sub-scanning direction, based on the fractional part of the misregistration correction amount $\Delta y$ and calculated as follows:

$$\beta = \Delta y - k$$

$$\alpha = 1 - \beta$$

wherein $\alpha$ is the distribution rate for a preceding pixel, and $\beta$ is the distribution rate for a succeeding pixel.

FIG. 7E shows a bit map image after the gradational correction (after gradational conversion), by regulating the gradational levels of the preceding and succeeding pixels in the sub-scanning direction, according to the coefficients shown in the gradational conversion table in FIG. 7D. FIG. 7F shows an exposed image on the image bearing member with the bit map image after the gradational conversion, and such exposed image cancels the inclination of the main scanning line thereby providing a horizontal linear line.

However, in a fine image, the correction less than a pixel is preferably not executed in consideration of the image quality. In such case, the distribution rates of the gradation level between the preceding and succeeding pixels in the sub-scanning direction may be uniformly selected as:

$$\beta = 0, \text{ and}$$

$$\alpha = 1$$

FIG. 8A shows the correction coefficients in such case, in a similar manner as in FIG. 7D. FIG. 8B shows a bit map image corresponding to FIG. 7E, and FIG. 8C shows an exposed image on the image bearing member, corresponding to FIG. 7F. Images as shown in FIGS. 8A to 8C are for a fine image, when the correction less than a pixel is not executed.

An image to be subjected to a registration correction less than a pixel and an image not to be subjected to such correction less than a pixel are judged by smoothing judgment means 806, and a method of judgment will be explained later. Based on the result of such judgment, gradation conversion table selecting means, which is not illustrated, selects a gradation conversion table to be used.

Finally, the halftone process means 808 executes a halftone process, and the thus processed image data are transmitted, through the transfer buffer 414, to the pulse width modulation (PWM) means 415.

In the following, a judgment method executed by the smoothing judgment means 806 of the present embodiment will be explained. A fine image, formed by fine lines as shown in FIGS. 13A1 to 13A6, is preferably not subjected to a registration correction less than a pixel in terms of the image quality. On the other hand, an isolated fine line as shown in FIGS. 13B1 to 13B3 is preferably subjected to a registration correction less than a pixel in terms of the image quality.

A judgment method explained in the following discussion makes it easy to distinguish an image to be subjected to a registration correction less than a pixel and an image not to be subjected to such correction.

Figure 14:
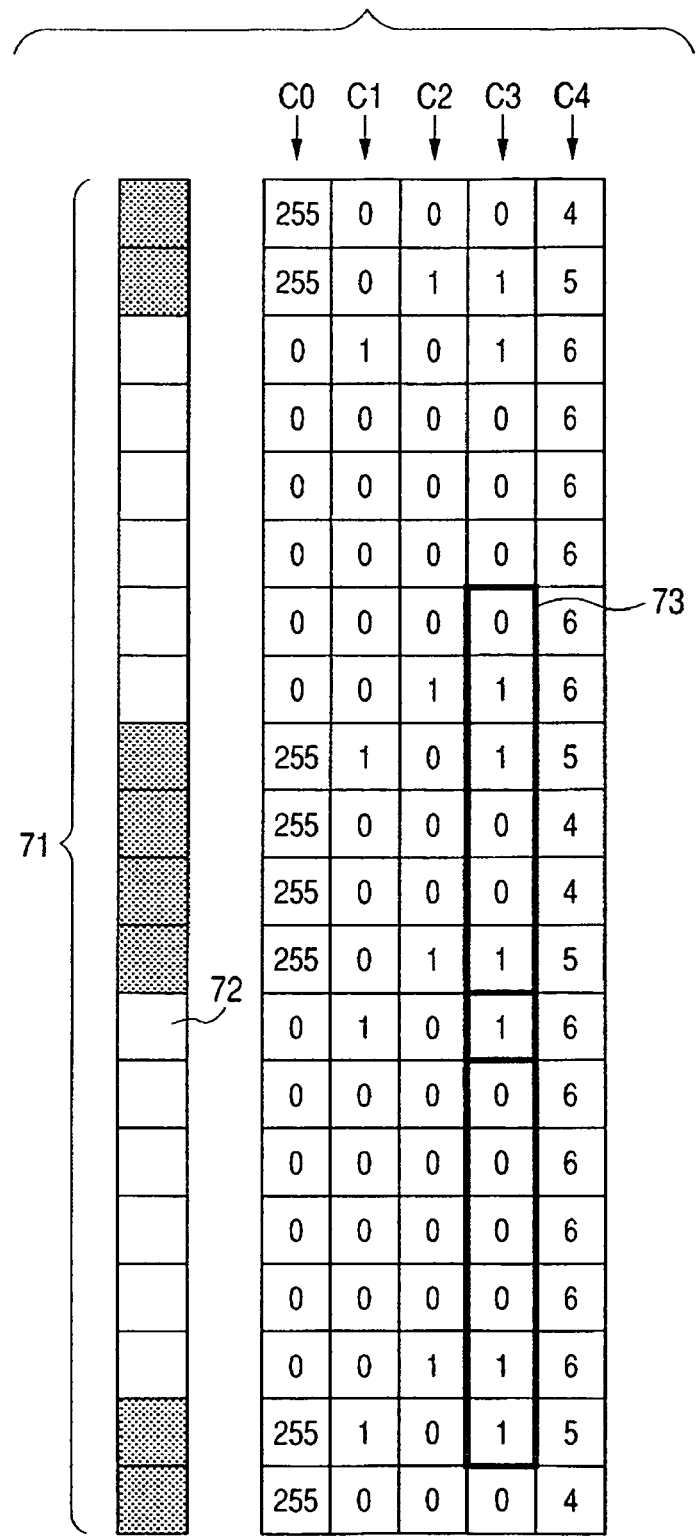
FIG. 14 is a view showing a judgment method in smoothing judgment means in the embodiment 1.

FIG. 14 shows a patch 71 formed by an image of 1 pixel (in main scanning direction) by 20 pixels (in sub-scanning direction). C0 indicates a gradation level of cyan color only in each pixel. C1 indicates a binarized absolute value of a difference of the gradation level of an object pixel and that of an upper pixel. For example, C1 is taken as "1" when the absolute value of the difference is 128 or larger. C2 indicates a binarized absolute value of a difference of the gradation level of an object pixel and that of a lower pixel, and, as in C1, is taken as "1" when the absolute value of the difference is 128 or larger. C3 indicates an "OR" value of C1 and C2. C4 indicates a number of pixels with C3=1 within a window filter 73. When C4 is 5 or larger, an object pixel is judged as a part of a fine image, and a registration correction less than a pixel is not executed. This is because, as shown in FIG. 15, a pixel constituting an isolated fine line always meets a condition C4=4. In this manner, an isolated fine line and a fine image can be easily distinguished.

In an object pixel 72 shown in FIG. 14, having a gradation level 0, a gradation level 255 in an upper pixel and a gradation level 0 in a lower pixel, there are obtained C1=1, C2=0 and C3=1. Also C4=6 because the window filter 73 of 1 pixel (main scanning direction) by 13 pixels (sub-scanning direction) contain 6 pixels of C3=1. Therefore the subject pixel 72, having C4≧5, is judged as a part of a fine image. Similar processes as for cyan color are executed also on the magenta gradation M0, yellow gradation Y0 and black gradation K0. In C2 and C3, the threshold value for binarizing the image is not limited to 128. Also the threshold value for distinguishing an image to be subjected to a registration correction less than a pixel and an image not to be subjected to such correction is not limited to C4≧5 but should be determined suitably in consideration of the image quality.

As explained in the foregoing, the judging method of the present invention can cover all the fine images that may give rise to the drawback of density unevenness, through the use of a window filter which is compact and has a wide applicability, and it is unnecessary, as in the prior technology, to prepare all the image patterns that may give rise to the drawback of density unevenness and to execute comparison on such patterns. Therefore, in an electrical correction for misregistration, there can be provided a method of easily distinguishing an image to be subjected to a registration correction less than a pixel and an image not to be subjected to such correction.

Embodiment 2

An embodiment 2 explains a method, utilizing a two-dimensional window filter, for distinguishing an image to be subjected to a registration correction less than a pixel and an image not to be subjected to such correction. Other processes are the same as those in the embodiment 1, and will not, therefore, be explained.

Figure 16A:
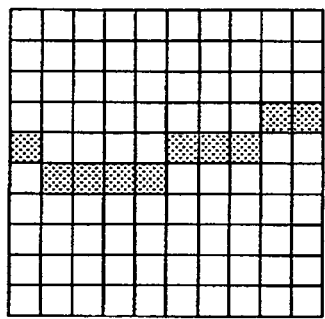
FIGS. 16A, 16B and 16C are views each of which shows an example of image, constituted of a plurality of short fine lines along a scanning direction in an embodiment 2.
Figure 16B:
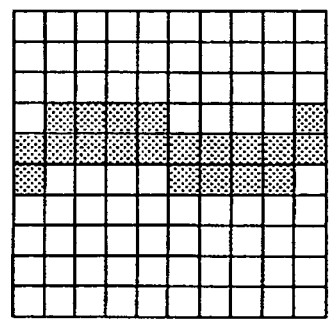
Figure 16C:
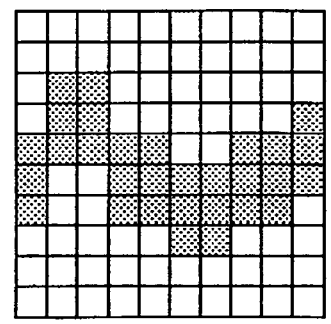

In the judging method utilizing a one-dimensional window filter as explained in the embodiment 1, an image constituted of a plurality of short lines along the scanning direction, as shown in FIGS. 16A to 16C, as an isolated fine line, and a registration correction less than one pixel is executed. An isolated fine line elongated in the scanning direction, as explained in the embodiment 1 and shown in FIG. 13B1 to FIG. 13B3, is preferably subjected to a registration correction less than a pixel in terms of image quality, but an image constituted of a plurality of short fine lines along the scanning line as shown in FIGS. 16A to 16C is preferably not subjected to a registration correction less than a pixel in terms of image quality.

The judging method with a two-dimensional window filter, to be explained in the following, allows to easily distinguish an image to be subjected to a registration correction less than a pixel and an image not to be subjected to such correction, also taking an image constituted of a plurality of short fine lines along the scanning direction into consideration.

Figure 17A:
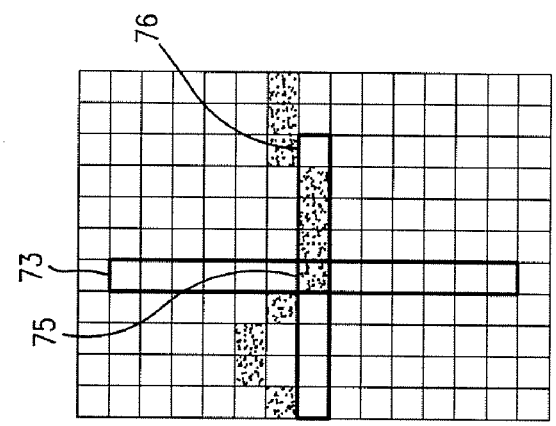
FIGS. 17A and 17B are views showing a judgment method in smoothing judgment means in an embodiment 2.

A judging method in smoothing judgment means 806 of the present embodiment will be explained with reference to FIGS. 17A and 17B. FIG. 17A shows a state of applying a two-dimensional window filter on an image constituted of a plurality of short fine lines along the scanning direction. On an object pixel 75, there are applied a window filter 73 of 1 pixel (main scanning direction) by 13 pixels (sub-scanning direction) and a window filter 76 of 9 pixels (main scanning direction) by 1 pixel (sub-scanning direction). The data processing method in the window filter 73 elongated in the sub-scanning direction is similar to that explained in the embodiment 1. The data process method in the window filter 76 elongated in the main scanning direction will be explained in the following.

Figure 17B:
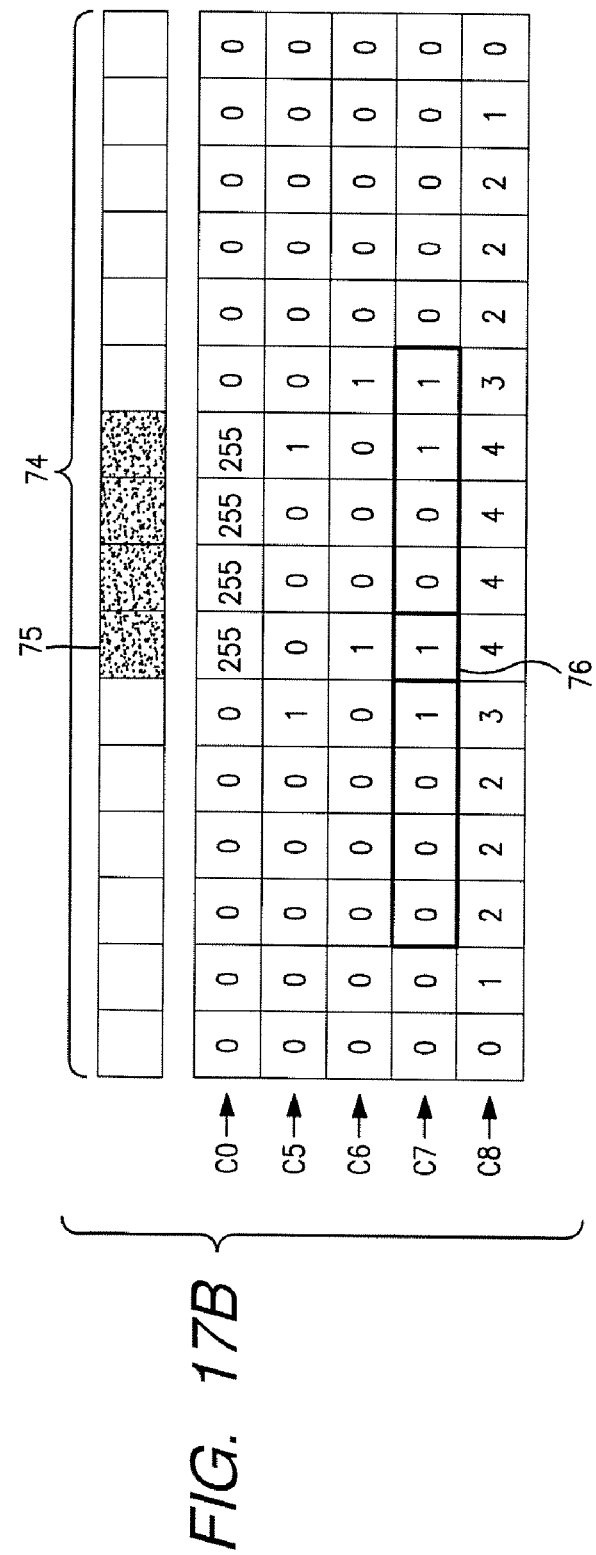
Figure 18:
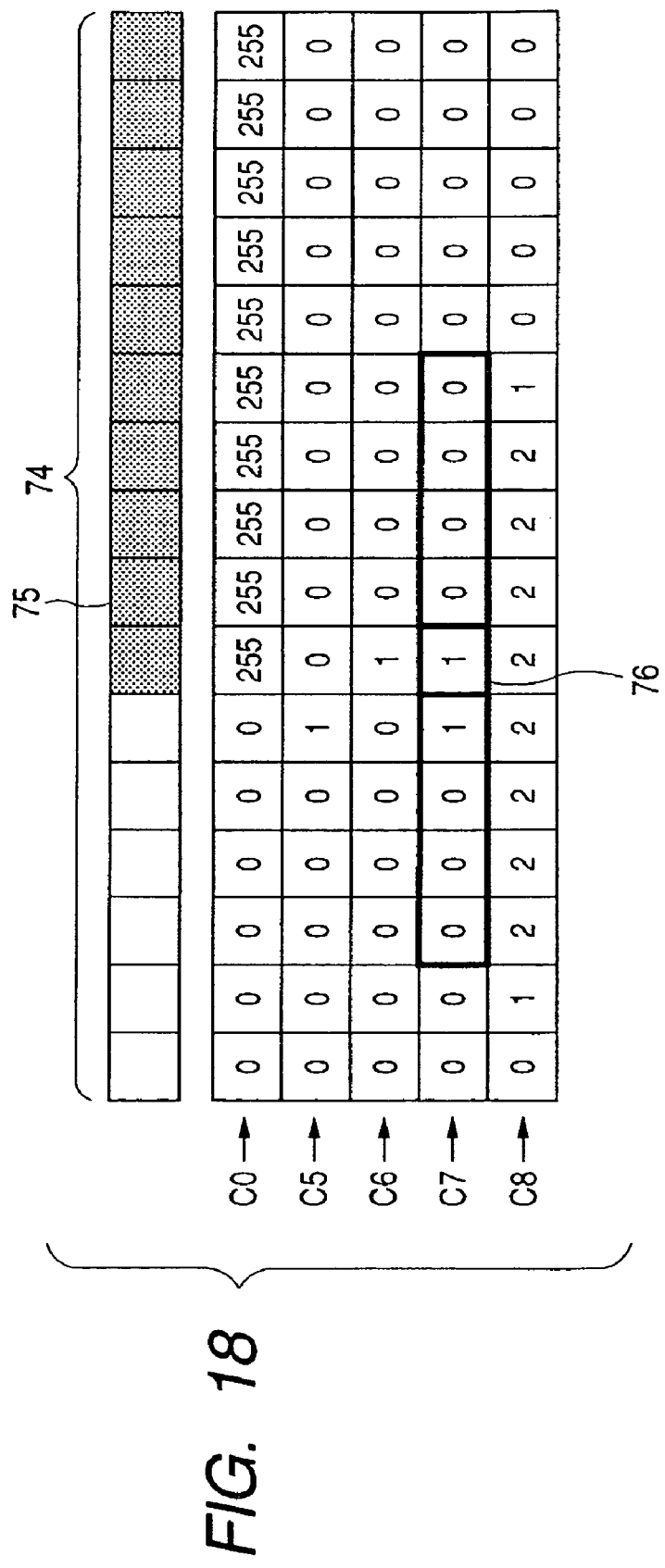
FIG. 18 is a view showing a judgment method in smoothing judgment means in the embodiment 2.

FIG. 17B shows a patch 74 formed by an image of 16 pixels (in main scanning direction) by 1 pixel (in the sub-scanning direction), including a window filter 76 of 9 pixels (in main scanning direction) by 1 pixel (in the sub-scanning direction). C0 indicates a gradation level of cyan color only in each pixel. C5 indicates a binarized absolute value of a difference of the gradation level of an object pixel and that of a pixel adjacent to the right. For example, C5 is taken as "1" when the absolute value of the difference is 128 or larger. C6 indicates a binarized absolute value of a difference of the gradation level of an object pixel and that of a pixel adjacent to the left, and, as in C5, is taken as "1" when the absolute value of the difference is 128 or larger. C7 indicates an "OR" value of C5 and C6. C8 indicates a number of pixels with C7=1 within the window filter 76. When C8 is 3 or larger, the object pixel is judged as a part of an image constituted of short fine lines along the scanning direction, and a registration correction less than a pixel is not executed. This is because, as shown in FIG. 18, a long isolated fine line along the scanning line always meets a condition C8≧2. In this manner, an isolated fine line and an image constituted of a plurality of short fine lines along the scanning direction can be easily distinguished.

In an object pixel 75 shown in FIG. 17B, having a gradation level 255, a gradation level 255 in a right adjacent pixel and a gradation level 0 in a left adjacent pixel, there are obtained C5=0, C6=1 and C7=1. Also C8=4 because the window filter 76 of 9 pixels (main scanning direction) by 1 pixel (sub-scanning direction) contains 4 pixels of C7=1. Therefore the subject pixel 75, having C8≧3, is judged as a part of an image constituted of a plurality of short fine lines along the scanning direction. Similar processes as for cyan color are executed also on the magenta gradation M0, yellow gradation Y0 and black gradation K0. In C5 and C6, the threshold value for binarizing the image is not limited to 128. Also the threshold value for distinguishing an isolated fine line and an image constituted of a plurality of short fine lines along the scanning direction is not limited to C8≧3 but should be determined suitably in consideration of the image quality.

The present embodiment executes two judgments with two window filters, namely a window filter 73 elongated in the sub-scanning direction and a window filter 76 elongated in the main scanning direction. The registration correction less than a pixel is not executed on an object pixel, that is judged as "not to execute the registration correction less than one pixel" in at least either of the window filters. The registration correction less than a pixel is executed on the object pixel, that is judged as "to execute the registration correction less than one pixel" in both window filters.

As explained in the foregoing, the judging method of the present embodiment is capable, through the use of a two-dimensional window filter which is compact and has a wide applicability, of executing a judgment even on an image constituted of a plurality of short fine lines along the scanning direction, that cannot be property judged by the one-dimensional window filter. Therefore, in an electrical correction for misregistration, there can be provided a method of easily distinguishing an image to be subjected to a registration correction less than a pixel and an image not to be subjected to such correction.

Embodiment 3

The present embodiment 3 explains a judging method for an image to be subjected to a registration correction less than a pixel and an image not to be subjected to such correction, taking an order number of the color into consideration. Other processes are similar to those in the embodiments 1 and 2, and will not be explained further.

Though non-execution of the correction less than a pixel for preventing the density unevenness in a fine image is effective on a fine image of a primary color, but may rather deteriorate the image quality of a fine image of a higher-order color. This is because, in the misregistration correction in the unit of a pixel, a line offsetting boundary is different from color to color, so that the misregistration amount becomes discontinuous at such boundary, and such discontinuity appears conspicuously in an image of a high-order color.

Figure 19:
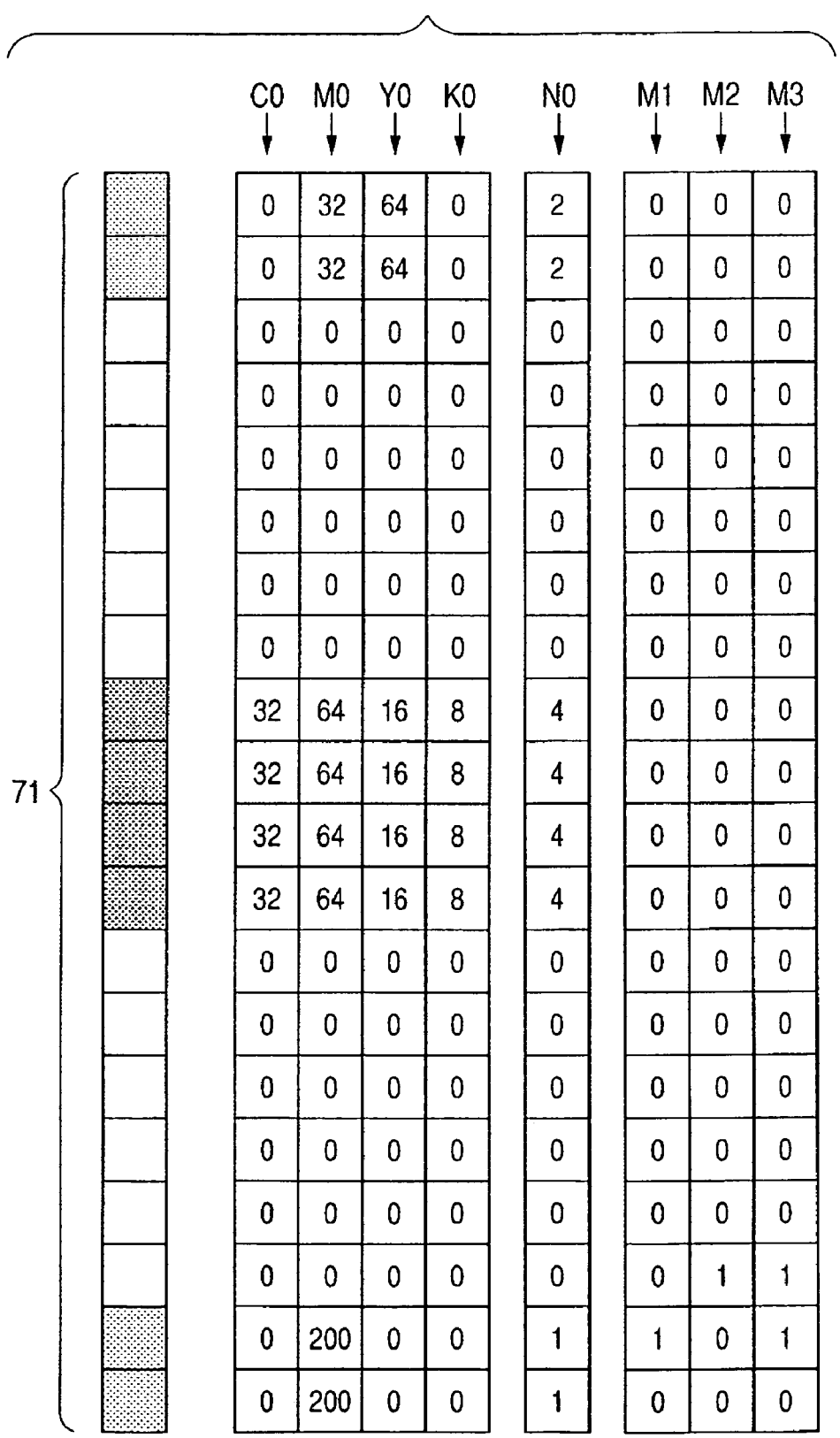
FIG. 19 is a view showing a judgment method in smoothing judgment means in an embodiment 3.

A judging method in smoothing judgment means 806 of the present embodiment will be explained with reference to FIG. 19. FIG. 19 shows a patch 71 formed by an image of 1 pixel (in main scanning direction) by 20 pixels (in sub-scanning direction). C0 indicates a gradation level of cyan color, M0 indicates a gradation level of magenta color, Y0 indicates a gradation level of yellow color, and K0 indicates a gradation level of black color. N0 indicates an order of the color of an object pixel, and N=1 for an object pixel of a primary color, N=2 for a second-order color, N=3 for a third-order color, N=4 for a fourth-order color, and N0=0 for a colorless state.

In case of N≦1, C1-C4, M1-M4, Y1-Y4 and K1-K4 are calculated as explained in the embodiment 1. In case of N≧2, conditions are assumed as C1=C2=C3=0, M1=M2=M3=0, Y1=Y2=Y3=0 and K1=K2=K3=0. In this manner, it is made possible not to execute the correction less than a pixel only on the fine image of a primary color.

As explained in the foregoing, by considering the order of color in the judgment by the smoothing judgment means, it is rendered possible to provide, in an electrical correction for misregistration, a method of distinguishing an image to be subjected to a registration correction less than a pixel and an image not to be subjected to such correction in simple manner and also in consideration of the image color.

Embodiment 4

The present embodiment 4 explains a judging method for an image to be subjected to a registration correction less than a pixel and an image not to be subjected to such correction, with different judging conditions for different colors. Other processes are similar to those in the embodiments 1 to 3, and will not be explained further.

The density unevenness of a fine image appears differently also depending on the image color. In particular, it is strongly related with a luminocity level of the image, and the density unevenness tends to appear conspicuously in a fine image formed with a dark color. This is because of a larger difference in luminocity between the image and the recording medium in background. A 100% solid image of a single toner color has a luminocity of about 45 in case of cyan, about 55 in case of magenta, about 85 in case of yellow and 25 in case of black, so that these images become darker in the decreasing order of (1) black, (2) cyan, (3) magenta and (4) yellow.

The following conditions are changed according to the image color:

a threshold for binarizing image;

a threshold between an image to be subjected to a registration correction less than a pixel and an image not to be subjected to such correction; and a size of a window filter.

FIG. 20 shows an example of the conditions set for each color. The image binarizing threshold is selected at such gradation levels providing a luminocity level of about 65 in cyan, magenta and black colors. The yellow image, showing a luminocity 85 even in a 100% solid image, is considered as an image to be subjected to the registration correction less than a pixel. It is also possible to change the boundary between the image to be subjected to the registration correction less than a pixel and the image not to be subjected to such correction, by changing the threshold value between the image to be subjected to the registration correction less than a pixel and the image not to be subjected to such correction and changing the size of the window filter. The boundary is selected at a position where the image is finer in a more luminous color and where the image is less fine in a less luminous color, in such a manner that, when the image is observed macroscopically, the luminocity of the image at the boundary becomes about constant regardless of the color.

As explained in the foregoing, by selecting the judging condition for each color in the smoothing judgment means, it is rendered possible to provide, in an electrical correction for misregistration, a method of distinguishing an image to be subjected to a registration correction less than a pixel and an image not to be subjected to such correction in simple manner and also in consideration of the image color.

The present invention has been explained by certain preferred embodiments, but the present invention is not limited to such embodiments and is naturally subject to various modifications or applications within the scope and spirit of the appended claims.

This application claims priority from Japanese Patent Application No. 2005-184947 filed Jun. 24, 2005, which is hereby incorporated by reference herein.

What is claimed is:

1. A color image forming apparatus comprising:
a plurality of image forming parts each of which forms an image;
a transfer part which transfers in order images of a plurality of colors formed by the plurality of image forming parts;
a first conversion part which offsets a coordinate value of the image in a sub-scanning direction to convert the coordinate value of the image, based on misregistration information to correct a mechanically caused misregistration of the image, for executing a misregistration correction in a unit of a pixel;
a second conversion part which adjusts a gradation level of pixels in a sub-scanning direction to convert a gradation level of the image, based on the misregistration information, for executing a misregistration correction in a unit less than a pixel; and
a judgment part which judges whether to execute the misregistration correction in the unit less than a pixel by the second conversion part on an object pixel, based on pixels around the object pixel.

2. A color image forming apparatus according to claim 1, wherein the second conversion part includes a plurality of gradation conversion tables and a selector for selecting a gradation conversion table to be used for the gradation conversion, and
wherein at least one of the plurality of gradation conversion tables is adapted to invalidate the misregistration correction in the unit less than a pixel.

3. A color image forming apparatus according to claim 1, wherein the judgment part is adapted to calculate a difference in a gradation level between an object pixel and a pixel adjacent in a sub-scanning direction, to binarize the image based on the difference in the gradation level, to measure a number of pixels in each gradation level in a binarized image within a predetermined area containing the object pixel, and to make a determination of non-execution of the misregistration correction in the unit less than a pixel when the number of pixels is equal to or larger than a predetermined threshold value and execution of the misregistration correction in a unit less than a pixel for other images.

4. A color image forming apparatus according to claim 3, wherein the predetermined area is an area defined by one pixel in a main scanning direction and by a plurality of pixels in the sub-scanning direction.

5. A color image forming apparatus according to claim 1, wherein the judgment part is adapted to calculate a difference in a gradation level between an object pixel and an adjacent pixel in a main scanning direction, to binarize the image based on the difference in the gradation level, to measure a number of pixels in each gradation level in a binarized image within a predetermined area containing the object pixel, and to make a determination of non-execution of the misregistration correction in a unit less than a pixel when the number of pixels is equal to or larger than a predetermined threshold value and executing the misregistration correction in a unit less than a pixel for other images.

6. A color image forming apparatus according to claim 5, wherein the predetermined area is an area defined by a plurality of pixels in a main scanning direction and by one pixel in the sub-scanning direction.

7. A color image forming apparatus according to claim 1, wherein the judgment part judges whether to execute the misregistration correction in a unit less than a pixel, based on an order of a color of the object pixel.

8. A color image forming apparatus according to claim 7, wherein the judgment part judges, in a case the object pixel has a higher-order color, to execute the misregistration correction in the unit less than a pixel.

9. A color image forming apparatus according to claim 1, wherein the judgment part sets, for each color, a judging condition whether to execute the misregistration correction in a unit less than a pixel.

10. A color image forming apparatus according to claim 9, wherein the judging condition of the judgment part includes a threshold value for binarizing an image, a threshold value for a number of pixels for judging whether the misregistration correction in a unit less than a pixel is to be executed, and a size of the predetermined area including an object pixel.

11. A method of correcting misregistration in a color image forming apparatus, wherein the color image forming apparatus includes a plurality of image forming parts each of which forms an image; and a transfer part which transfers in order images of a plurality of colors formed by the plurality of image forming parts, said method comprising:

a first conversion step of offsetting a coordinate value in a sub-scanning direction to convert the coordinate value of the image, based on misregistration information to correct a mechanically caused misregistration of the image, for executing a misregistration correction in a unit of a pixel;

a second conversion step of adjusting a gradation level of pixels in the sub-scanning direction to convert the gradation of the image, based on the misregistration information, for executing a misregistration correction in a unit less than a pixel; and a determining step of determining whether to execute the misregistration correction in the unit less than a pixel in said second conversion step on an object pixel, based on pixels around the object pixel.

* * * * *